(12) United States Patent
White

(10) Patent No.: US 11,843,469 B2
(45) Date of Patent: Dec. 12, 2023

(54) EYE CONTACT ASSISTANCE IN VIDEO CONFERENCE

(71) Applicant: Microsoft Technology Licensing, LLC, Redmond, WA (US)

(72) Inventor: Ryen William White, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/732,603

(22) Filed: Apr. 29, 2022

(65) Prior Publication Data
US 2023/0353398 A1 Nov. 2, 2023

(51) Int. Cl.
*H04L 12/18* (2006.01)
*G06F 3/01* (2006.01)
*G06T 7/70* (2017.01)

(52) U.S. Cl.
CPC .......... *H04L 12/1818* (2013.01); *G06F 3/013* (2013.01); *G06T 7/70* (2017.01); *G06T 2207/10016* (2013.01)

(58) Field of Classification Search
None
See application file for complete search history.

(56) References Cited

U.S. PATENT DOCUMENTS

| | | |
|---|---|---|
| 2011/0193935 A1 | 8/2011 | Gorzynski |
| 2012/0140023 A1 | 6/2012 | Cutler |
| 2016/0323503 A1 | 11/2016 | Wada |
| 2019/0373214 A1 | 12/2019 | Gurr et al. |
| 2020/0314299 A1 | 10/2020 | Okuley |
| 2021/0405865 A1 | 12/2021 | Faulkner |
| 2022/0126201 A1 | 4/2022 | Ma et al. |
| 2022/0246060 A1* | 8/2022 | De Salvo ............... A61B 5/004 |
| 2022/0398869 A1* | 12/2022 | Wright ................... H04N 5/272 |

FOREIGN PATENT DOCUMENTS

JP H10150599 A 6/1998

OTHER PUBLICATIONS

"International Search Report and Written Opinion Issued in PCT Application No. PCT/US23/017005", dated Jun. 16, 2023, 12 Pages.

* cited by examiner

*Primary Examiner* — Angela Nguyen
(74) *Attorney, Agent, or Firm* — Schwegman Lundberg & Woessner, P.A.

(57) ABSTRACT

Generally discussed herein are devices, systems, and methods for eye contact assistance in a video conference. A method can include determining a location of the web camera relative to a display, providing a user interface of the video conference on the display, and providing, on the user interface, a graphic display of information at pixels of the display that are most proximate the location.

20 Claims, 7 Drawing Sheets

EYE CONTACT ASSISTANCE IN VIDEO CONFERENCE

BACKGROUND

Eye contact can be important in interpersonal communication. Eye contact helps people build trust, establish relationships, persuade, or the like. Research on in-person meetings shows that people tend to make eye contact up to about 60% of the time during the in-person meetings. Maintaining eye contact in online meetings can be challenging.

SUMMARY

A device, system, method, and computer-readable medium configured for eye contact assistance in video conferences. Eye contact can be facilitated by attracting a gaze of a participant proximate a camera. Attracting the gaze can include displaying information or changing information displayed at pixels of the display that are most proximate the camera. Information presentation can be tailored by a participant, such as to alter a form or content of the information presented most proximate the display. Conditions under which the information is presented most proximate the display can be defined by a participant. Other innovations can be realized by the teaching of the specification.

A method can include determining a location of the web camera relative to a display. The method can include providing a user interface of the video conference on the display. A graphic display of information at pixels of the display that are most proximate the location can be provided on the user interface. Video data can be received from the web camera. A gaze direction of a user in the video data can be determined based on the video data. The location of the web camera can be inferred based on the gaze direction.

Determining the location of the web camera can include prompting, by the user interface, a user to provide the location; and receiving the location from the user. Trigger data can be defined by the user. The trigger data can be analyzed to determine a condition is met. Responsive to determining the condition is met, the information can be provided by the pixels.

The method can further include receiving, from a user and by the user interface, information data indicating content of the information. The method can further include receiving, from the user and by the user interface, form data indicating how the content is presented. The method can further include presenting, by the user interface, the content in a form indicated by the form data. The information can include video data of an active speaker, a chat window, or content of a shared screen. The information can include data received by a second application, the second application different from an application the provides functionality of the video conference.

The method can further include determining a user is not gazing at the camera and responsive to determining the user is not gazing at the camera, providing the information at the pixels. Determining the user is not gazing at the camera, includes determining the user has not gazed at the camera for a specified amount of time.

DETAILED DESCRIPTION

Figure 1:
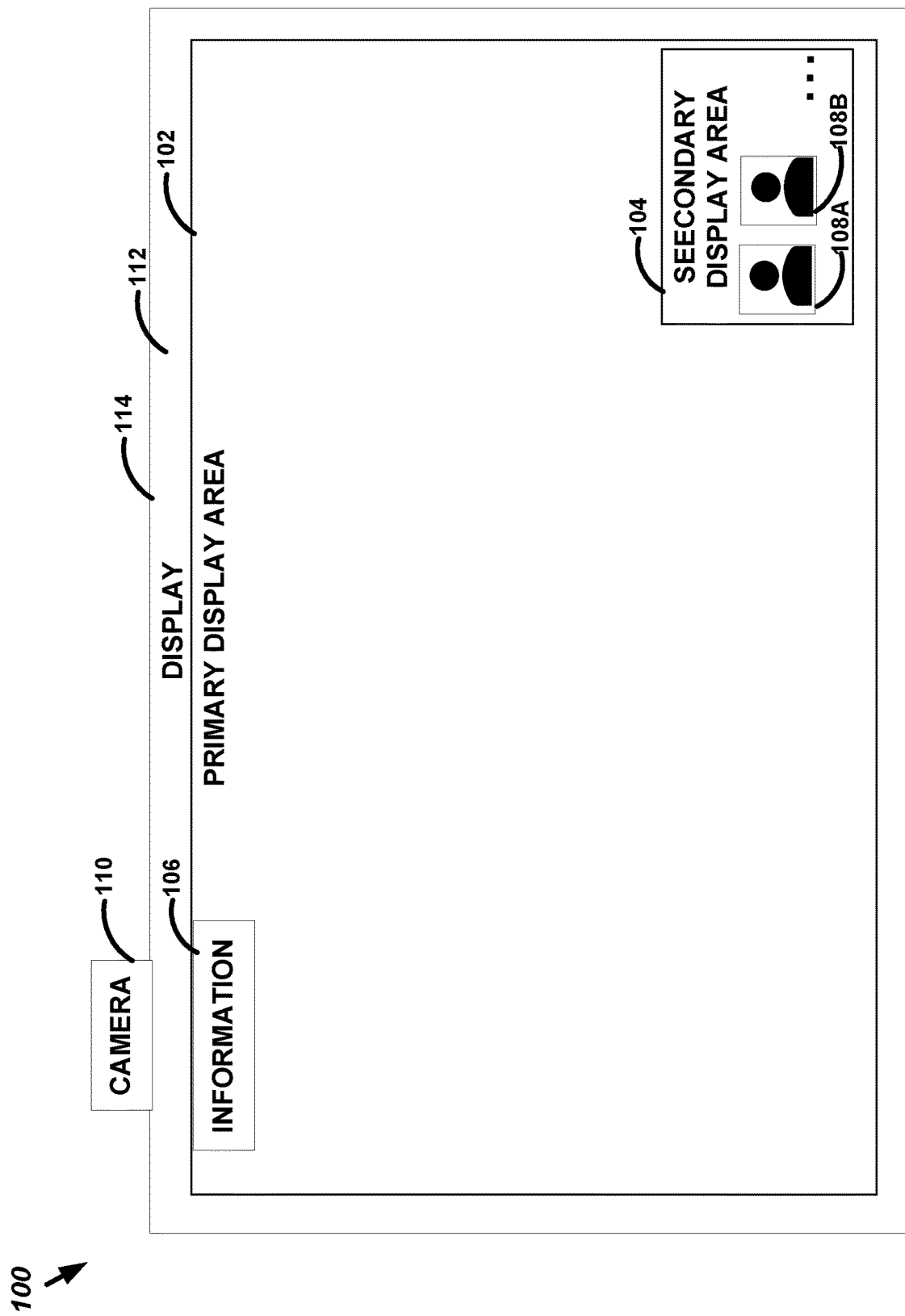
FIG. 1 illustrates, by way of example, a block diagram of an embodiment of a video conference system.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

People are spending a lot more time in conference calls via technology, as opposed to meeting in-person. Often times, a position of a webcam relative to a video conference display is such that a user appears as if they are not engaged with the conference. For example, in some configurations, a webcam will be focused on a side of a face, a forehead, or a chin of a participant or not on the participant at all. These configurations can provide an appearance that the participant is not engaged whether the participant is actually engaged or not.

Embodiments provide a mode within a communications platform (Microsoft Teams®, Zoom®, Duo®, FaceTime®, WebEx, GoToMeeting, etc.) where presentation of information during a meeting can be used to help a user maintain eye contact. The eye contact improvement can be realized by presenting information on a display near a location of a camera. By changing what is presented near the camera or presenting information of interest to the participant, the participant will naturally tend to look proximate the camera providing important eye contact. "Near" or "proximate" in this context means as close to the camera as possible given the bezel and webcam location.

In one example, a location of the camera (sometimes called a webcam) can be determined. A user (sometimes called a participant) can provide information indicating the position of the camera relative to the display or the camera location can be inferred. Embodiments can then provide support, such as a surface script, note, potential question, chat entry, active participant video, or the like in a location near the camera; surface a notification about an incoming call, instant message, incoming email, upcoming meeting, or the like near the camera location; locate a chat window near the camera location; provide a "nudge" to a user to look at the camera more often (e.g., based on a machine learning (ML) inference about eye contact from the camera signal); or provide a contextually-relevant recommendation based on the meeting transcript, attendees, etc. near the camera location, or the like.

Embodiments can be adapted to a preferred engagement style of a user based on active context of the conference. Context in this instance includes whether the user is speaking, whether the user is providing content (e.g., sharing a document, screen, chatting, or the like), whether the camera is turned on, or the like. Embodiments can provide information near a webcam location during an online meeting, so as to increase perception of user engagement with the camera. Embodiments help create a perception of better eye (camera lens) contact, leading to better meeting outcomes.

Reference will now be made to the FIGS. to describe further details of embodiments. The FIGS. illustrate examples of embodiments and one or more components of one embodiment can be used with, or in place of, a component of a different embodiment.

FIG. 1 illustrates, by way of example, a block diagram of an embodiment of a video conference system 100. The system 100 is merely an example of a video conference system and many other variations of displays and camera configurations are possible. For example, many modern systems include multiple displays, the content of which is controlled by a single operating system. Other modern systems include a camera 110 built into a bezel 112 of a display 114 (e.g., such as a modern laptop computers, teleprompter, other modern systems integral with or communicatively coupled to a camera situated behind or into a primary display area 102 or other portion of the display 114 (e.g., such as a modern smartphone, tablet, or the like), among many other configurations.

The system 100 includes a camera 110 communicatively coupled to a display 114. The display 114 provides a medium through which a user can interact with a user interface that includes a primary display area 102 and a secondary display area 104. The display areas 102, 104 are configurable in size and location. The display areas 102, 104 are controlled by a video conference application. Not all video conference applications provide multiple display areas 102, 104, thus the secondary display area 104 is optional.

The display 114 provides a view of the primary display area 102 and the secondary display area 104. The primary display area 102 provides a view of the present speaker, a shared document, a meeting organizer, or the like. The primary display area 102 is typically what participants are viewing when they are consuming the video conference. The main content of the meeting is provided through the primary display area 102 or a person talking who controls what is presented in the primary display area 102.

The display 114 further includes a secondary display area 104. The secondary display area 104 can include icons or avatars representing individual attendees of the meeting, camera feeds of the attendees, or a combination thereof. The secondary display area 104 as illustrated includes icons 108A, 108B of the individual attendees, as a simple illustrative example. While the secondary display area 104 is illustrated on the primary display area 102, the secondary display area 104 can be situated in a variety of other locations, such as off the primary display area 102.

The display 114 further includes information 106 presented near a camera 110 built into or coupled to the display 114. Presenting the information 106 near the camera 110 can cause the user to look towards the camera 110. Looking towards the camera 110 causes the perception of user engagement with the video conference. The information 106 is illustrated as separate from the primary display area 102 and the secondary display area 104. However, the information 106 can include the content of the primary display area 102 or the secondary display area 104, such that the primary display area 102 or the secondary display area 104 are presented as the information 106.

The bezel 112 of the display 114 is a physical border around the display 114. The bezel 112 is the border between a screen that provides a view of an image and a frame or housing of the electric/electronic components of the display 114, smartphone or any other computing device.

Figure 2:
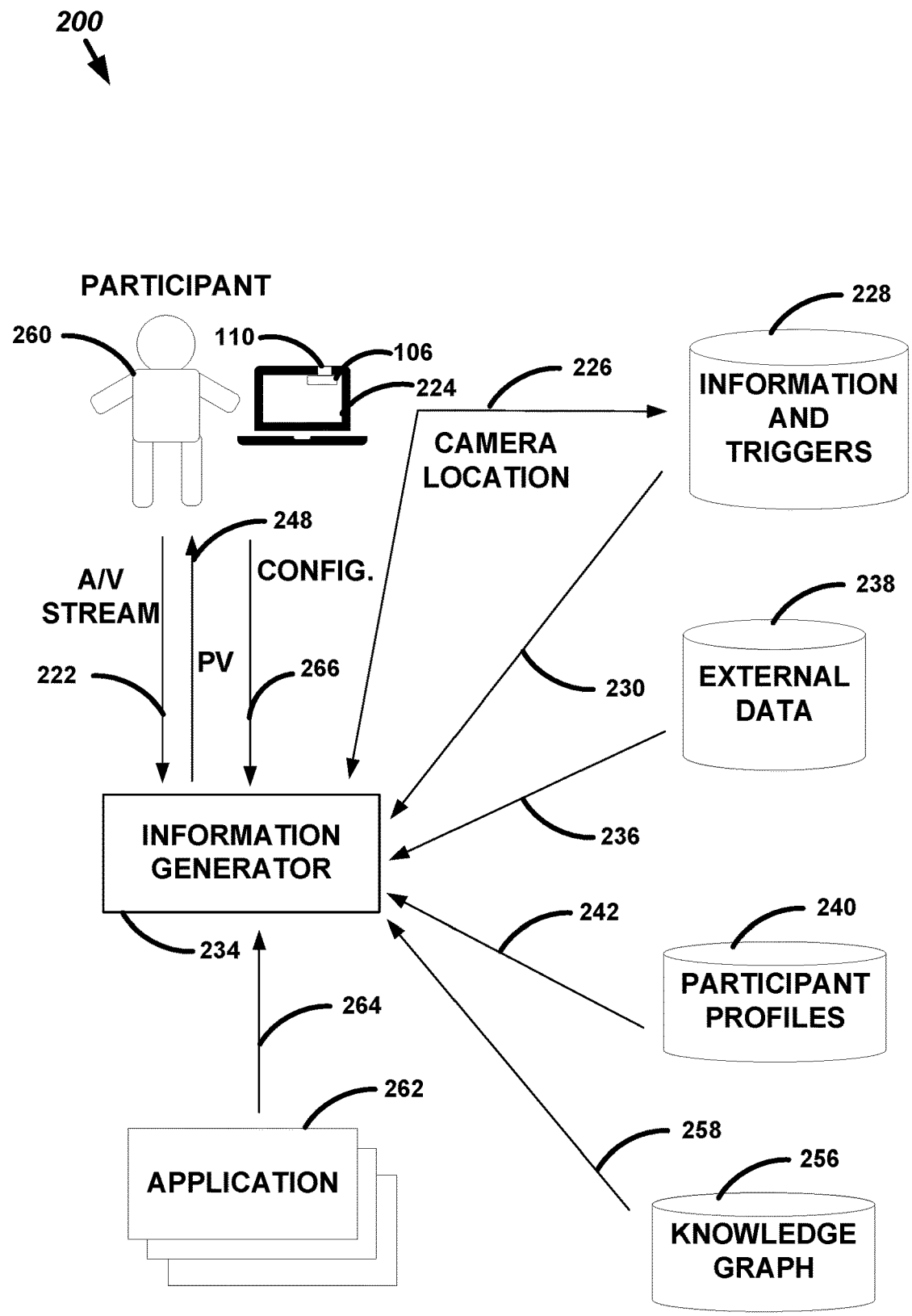
FIG. 2 illustrates, by way of example, a block diagram of an embodiment of a system for eye contact assistance in a video conference.

FIG. 2 illustrates, by way of example, a block diagram of an embodiment of a system 200 for eye contact assistance in a video conference. The system 200 as illustrated includes an information generator 234, and one or more data sources including meeting environment data 220, information and triggers 228, external data 238, knowledge graph 256, and participant profiles 240.

The information generator 234 determines a camera location 226. Determining the camera location 226 can include looking up the camera location in the external data 238. Determining the camera location 226 can include requesting the participant 260 to look at the camera 110, such as by an audio prompt, visual prompt, tactile prompt, or a combination thereof and using gaze tracking to determine where the participant is looking. Gaze tracking in discussed more detail elsewhere. Determining the camera location 226 can include generating and analyzing a histogram of a gaze location of the participant 260 during a video conference. For many participants, the gaze of the participant 260 can be indicated by a spike in the histogram of the gaze location. Determining the camera location 226 can include using a trained machine learning (ML) model to determine the location of the camera 110. The ML model can be trained using video data labelled to indicate the location of the camera. The ML model can then receive further video data and provide a classification of the camera location as output.

Receiving the camera location 226 can include receiving data, from a device 224, indicating a location of the camera 110 (see FIG. 1) about the display 114. The participant 260 can indicate, such as by clicking on a picture of a display configuration, the camera location 226. The camera location 226 can include data indicating a number of displays, configuration of displays relative to one another, an identifier indicating the display(s) which are nearest the camera 110, position information indicating a location on the display(s) that is nearest the camera 110, or the like. The device 224 can, via the operating system of a control panel of the device 224, determine a monitor configuration and provide the participant with the monitor configuration.

The information generator 234 can be coupled to presenter participant device 224. The information generator 234 can provide a personalized view (PV) 248 to a meeting participant 260. The PV 248 can configure information presentation on a user interface presented by the device 224. The PV 248 can include data configured, by the information generator 234, to assist the participant 260 in increasing eye contact with the camera 110 during the meeting. The information generator 234 provides data that causes the device to present the information 106. The information 106 is a graphic display of data that catches attention of the participant 260 such that the participant looks at the graphic display of the information 106).

The information generator 234 can determine, based on image data from the camera 110 (called an audiovisual (A/V) stream 222 in FIG. 2), whether the participant 260 is making eye contact with the camera 110. Determining eye contact can include comparing a gaze destination to the camera location. If the gaze destination is near (e.g., within a specified distance or angle of the camera location 226), the user is determined to be looking at the camera 110. Responsive to determining the participant 260 is not making eye contact with the camera 110, the information generator 234 can cause information 106 to be displayed near the camera 110. In some embodiments, the information 106 can be displayed near the camera 110 irrespective of whether the participant 260 is making eye contact with the camera 110. In such embodiments, the information generator 234 (or other component of the system 200) does not need to determine whether the participant 260 is making eye contact with the camera 110. The information generator 234

The meeting environment data 220 can be accessed by the information generator 234. The meeting environment data 220 can include a date, time, meeting agenda, invitee list, required attendee list, optional attendee list, participant device information (e.g., make, model, capabilities, or the like), presentation (e.g., a file or other compute resource to be presented), or the like.

The information generator 234 can receive the A/V stream 222 from the device 224. Such an A/V stream is optional as the conference application operating the device 224 can include video data for the participant 260 as this data is typically aggregated at a central server (e.g., in the cloud) and provided to the device 224.

The information generator 234 can determine an emotion of the participant 260, a cue from the participant 260, or the like. The cue can include a spoken word phrase in the audio, a gesture in the video, an object in the video, or the like. For example, the participant 260 can cause a personalized message to be provided as the information 106 responsive to the cue, sometimes called a trigger. In another example, the participant 260 can cause a personalized message to be provided responsive to a specified gesture (e.g., an "okay", swipe in a specified direction, pointing at a specified object, clicking a software control with a mouse, touching their head, scratching their face, blinking, or other hand, face, or body gesture). In another example, the participant 260 can cause a personalized message to be provided responsive to a specified object appearing in the stream 222. The object can be in an image in a presentation file, an object that a presenter places in a field of view of their camera, or the like. The personalized message can be provided near the camera 110, such as to assist the participant 260 in maintaining eye contact with the camera 110.

The language generator 234 can perform object recognition, speech recognition, gesture recognition, or a combination thereof using multiple means for doing so, such as for example multiple different machine learning models. The object, speech, or gesture recognition can help determine whether a condition, indicated by a defined trigger, has been met. The trigger can then cause the information 106 to be presented proximate the camera 110 or can prohibit the information 106 from being presented proximate the camera 110. Embodiments are not limited to specific techniques for object, speech, or gesture recognition. Some examples of these techniques are provided just for context as to what is meant by object, speech, and gesture recognition. Example object detection techniques include those that use computer-aided drafting (CAD) like object models, edge comparison-based models, greyscale matching, gradient matching, histograms of receptive field responses, interpretation trees, pose consistency, pose clustering, invariance, geometric hashing, scale-invariant feature transform (SIFT), speeded up robust features (SURF), bag of words, neural network (NN), among many others. Example gesture recognition techniques include three-dimensional (3D) model-based techniques, skeletal-based techniques, appearance-based techniques, electromyography-based techniques, or the like. Example speech recognition techniques include hidden Markov models, dynamic time warping-based speech recognition, NNs, and end-to-end automatic speech recognition.

The participant 260, or an agent of the participant 260, can define information cues that can be stored in the information and triggers database 228. During meeting setup, meeting acceptance, before or during the meeting, a wizard can be presented by the device 224. The wizard can provide the participant 260 with options for providing the information 106. A wizard, sometimes called a setup assistant, is a piece of software that provides a user interface that presents a user with a sequence of dialog boxes that lead the user through a series of well-defined steps. Since the data available to the information generator 234 can be limited, and the form of the information 106 provided in the PV 248 can be limited as well, the setup assistant can guide the user through possible information presentations and stop the user from trying to use an unsupported condition or type.

Using the wizard, setup assistant, or a UI provided as part of a conference application, the participant 260 can define information criteria. The information criteria can include an indication of content of the information 106, one or more conditions that, when satisfied, cause the information 106 to be presented to an attendee, recipient of the information 106, and form of the information 106. The conditions can include time of day, passage of time, object detection, gesture detection, phrase detection, gaze away from the camera 110, a combination thereof, or the like. The conditions can be detected by a gaze detector operating in conjunction with a user-configurable timer, based on best practices of engaging presenters, or the like. The information 106 can include an image, text, audio, video, a clickable hyperlink, or other software control, such as a button, or other data to be provided to the person indicated as the recipient. The information 106 can be associated with criterion (sometimes called a characteristic condition because it is a condition that the user has a specified character trait or qualification), such that if a user satisfies the criterion, they receive that information 106. Some information can be default content (no criterion required to receive that information near the camera 110) and other information can be associated with criterion that, when satisfied, indicates that information 106 is to be provided to the participant 260. The information 106 criterion can be a profile parameter that can be derived from or expressly provided in a user profile for the participant 260. The profile parameter can indicate a job title, education status, expertise, task status, device type, current location other information about the attendee and available in the participant profiles, or the like.

The form of the information can include an indication how the information is presented. The form can include a type of the information 106, such as a text box, a thought bubble, a video (e.g., as a thumbnail or over the primary display area 102 or secondary display area 104, or the like), a graphic, a scrolling text box, or the like. The form of the information 106 can include a transparency, a font, a size of text or video, a color, a location of the message on the display (e.g., a display, a location on the display, such as background, corner, over presentation, or a combination thereof), a background pattern or image for the information 106, a customizable indicator that is provided along with the information 106 that indicates to the participant 260 that they have a message (e.g., a visual, audio, or tactile indicator), a combination thereof, or the like. The recipient can be any participant, an attendee or presenter participant. The recipient can be defined by name, email address, profile parameter, or the like.

The information generator 234 can receive information and trigger data 230 from the information and triggers 228, profile data 242 from the participant profiles 240, other data 236 from the external data 238, or a combination thereof. The external data 236 is any data relevant to the participant 260 but accessed from outside an organization for which the person that setup the meeting works. The external data 236 can include public data, such as can be available from a social media platform, county, state, or city records, the Census Bureau or other governmental organization, an electronic mail (email) server, a combination thereof or the like. The profile data 242 is data relevant to the participant and accessed from within the organization. The profile data 242 can include job position, task completion (e.g., as part of a larger project or group), a knowledge graph, a combination thereof, or the like.

The external data 236, profile data 242, knowledge graph data 258, or a combination thereof can be used by the information generator 234 to determine whether a condition in the information and trigger data 230 has been satisfied. Responsive to the condition(s) being satisfied, the information generator 234 can augment the A/V stream 222 to include the information 106 indicated by the information and trigger data 230.

In determining whether there is any information 106 associated with satisfied conditions, the information generator 234 can issue a query to the information and triggers 228 that returns whether any of the external data 236, profile data 242, or any combination thereof, satisfy conditions of the information 106. The information and triggers 228 can return any information associated with conditions that have been satisfied along with data indicating a recipient of the information and the format of the information. The information generator 234 can then add the information to the A/V stream for each recipient and provide the PV 248 to the corresponding participant 260.

The information generator 234 can include electric or electronic components arranged or programmed to perform operations thereof. The electric or electronic components can include one or more transistors, resistors, capacitors, diodes, amplifiers, switches, inductors, multiplexers, logic gates (e.g., AND, OR, XOR, negate, buffer, or the like), power supplies, memory devices, processing units (e.g., central processing units (CPUs), graphics processing units (GPUs), field programmable gate arrays (FPGAs), application specific integrated circuits (ASICs), or the like), analog to digital converters (ADCs), digital to analog converters (DACs), regulators, oscillators, or the like.

In some embodiments, the system 200 can generate messages and triggers and provide a corresponding PV 248 automatically (without human interference after deployment). The automatic information can be in addition to or alternative to manually defined information presentation. The automatic generation of the information can include the message generator 234 analyzing prior messages and triggers 228, external data 238, participant profiles 240, a meeting agenda, a knowledge graph 258, a combination thereof, or the like.

A knowledge graph 256 is not a database in a traditional sense of the word. Rather than being based on relational or object database models, the knowledge graph 256 is a graph database that maps relationships between users and their various activities. Graph databases are based on entities (or "nodes") and the mapped relationships (or "links") between them. Knowledge graphs are a good match for Web content, because in a way, the Web itself is a graph database—with its pages as nodes, and relationships represented by the hyperlinks connecting them. The entities in both Knowledge Graph and Satori from Microsoft Corporation are semantic data objects, each with a unique identifier, a collection of properties based on the attributes of the real-world topic they represent, and links representing the relationship from the topic to other entities. The entities also include actions that someone searching for that topic might want to take. Knowledge graph data 258 can be provided by the knowledge graph 256.

The information generator 234 can interface with one or more applications 262, such as a video conference application, web browser, personal information manager (PIM), finance application, sports application, social media application, computer aided drafting application, presentation generation application, among many other application types. The application 262 can provide the information generator 234 (e.g., responsive to a request or query from the information generator 234 or without prompting from the information generator 234) the information data 264 that can be presented as the information 106 on the device 224.

The information data 264 or the information 106 can include contextually relevant information. Contextually relevant information can take the form of reinforcing messages or supplementary messages relevant to (i) the conference (sometimes called a "meeting") in general, (ii) the current dialog to help land a point (e.g., a "For more information, see here" message sent to all or just a subset of participants), (iii) the current point in time (e.g., a "Time to move on" message sent to the speaker only if there are many items in the agenda.), or (iv) messages could be left by the speaker to remind themselves of things they ought to do during a meeting (e.g., "Ask everyone in the team for their opinion"). These contextual messages can support the speaker (e.g., help them land a point or provide supplementary information such as reminders, hyperlinks, or bulleted lists) and others on the call (e.g., obtain additional information and reminders).

There are at least three modalities for contextual messaging, such as (1) messages shared by the speaker, for consumption by others on the call, (2) messages shared directly to the current speaker, for consumption only by the current speaker, and (3) messages generated automatically by the conference technology (e.g., based on user-provided rules).

The messages in any modality can be guided by one or more of: (a) Organizational policy and supporting data. For example, all those who had not completed all their trainings could see the following message during an HR call: "Reminder: Complete your required trainings by <date>." (b) User specification. For example, the content of the messages could be provided by the speaker or conference manager in advance of the conference, even tagged with specific key phrases and/or timing to be used to trigger the messages. (c) System inference. For example, the content of the messages can be derived automatically from the meeting agenda, the meeting transcript, or communications in advance of the meeting, such as, reminders of commitments or requests made in email.

The format of the messages (how they are presented) can vary depending on the nature of the message, the nature of the call (e.g., formal meeting vs. informal chat), and the environment. The format can be user defined or vary based on inferences about optimal ways to communicate the message in the current context. The messages can also be actionable (e.g., via clickable hyperlinks).

The participant 260 can provide configuration data 266 to the information generator 234, such as through the device 224. The configuration data 266 can indicate the trigger, whether eye contact assistance is on or off, the information data 264 to be presented as the information, context, or the like. More details regarding the configuration data are provided regarding FIG. 7, among others.

Figure 3:
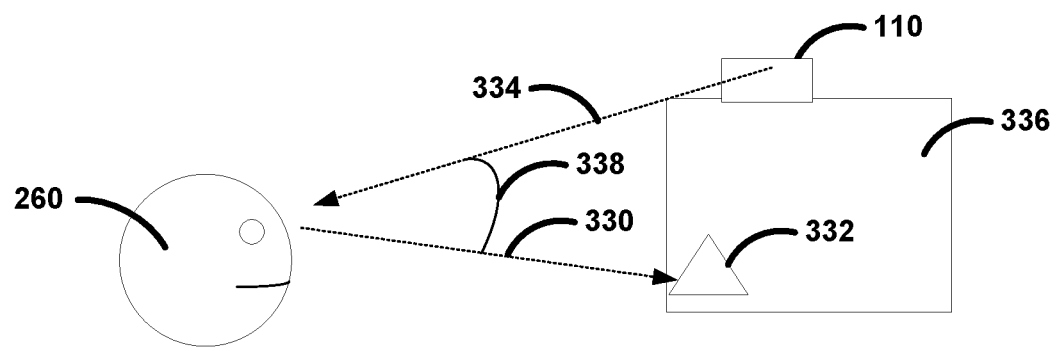
FIG. 3 illustrates, by way of example, a perspective view diagram of an embodiment of the participant making insufficient eye contact.
Figure 4:
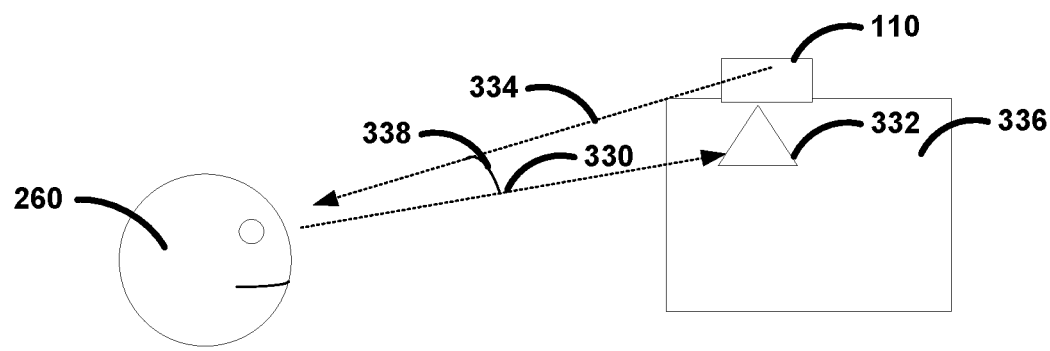
FIG. 4 illustrates, by way of example, a block diagram of an embodiment of the system after the object has been moved to be proximate the camera.

FIG. 3 illustrates, by way of example, a perspective view diagram of an embodiment of the participant 260 making insufficient eye contact. In FIG. 4, a gaze (indicated by arrow 330) of the participant 260 is on an object 332 that is not near the camera 110. The information generator 234 or another component of the compute device 224 can determine an object at which the participant 260 is gazing. There are many ways of gaze determination including, using eye models, eye features, object recognition, image filtering (e.g., Gabor wavelets), color distribution, head pose, or a combination thereof, identifying an eye, determining an iris or pupil center of the identified eye, and projecting through the center of the pupil along the line of sight (sometimes called the visual axis).

The participant 260, in the example of FIG. 3, can be perceived as being disinterested in the content being presented on a user interface 336 of a video conference. The perception of being disinterested can affect how other participants perceive the participant 260 in terms of professionalism, respect, courtesy, or the like. The perception of being disinterested can affect whether the participant 260 gets a job, gets a promotion, gets invited to events, or the like.

To help reduce the perception of being disinterested, the computing device 224 can help keep the gaze of the participant 260 near the camera 110. The time between gazes can be user-configurable, based on best practices, or the like. The time between eye contact can be mitigated by presenting attention-capturing information 106 proximate the camera 110. A quantification of gaze time can be provided retrospectively, such as after the video conference. The quantification can provide part of a report on meeting engagement ("you only looked at the camera 20% of the time you were speaking").

One or more components of the device 224, such as processing circuitry (see FIG. 9) and the information generator 234, can determine whether the gaze of the participant is near the camera 110. "Near" in this context means within a specified distance, specified number of pixels, defined neighborhood of pixels, or the like. In some instances, an angle 338 between the line of sight (indicated by line 330) of the participant 260 and the line of sight (indicated by line 334) of the camera 110 can be used to determine whether the gaze is near the camera 110. The user can specify a maximum angle that is considered near the camera 110 or a default specified angle can be used to determine whether the gaze is near the camera 110.

Responsive to determining the participant 260 is not gazing near the camera 110, the object 332 at which the user is gazing (the object 332 is an example of the information 106) can be moved on the user interface 336 such that the object 332 is near the camera 110. Then, as the gaze of the participant 260 remains on the object 332, the gaze ends up near the camera 110. The gaze being near the camera 110 provides the perception that the participant 260 is engaged with the presentation.

FIG. 4 illustrates, by way of example, a block diagram of an embodiment of the system after the object 332 has been moved to be proximate the camera 110. By presenting the object 332 near the camera 110, the angle 338 between the line of sight of the participant 260 and the line of sight of the camera 110 is reduced. Determining whether the object 332 is proximate the camera 110 can be determined by comparing the angle 338 to a criterion or presenting the object 332 as near the camera 110 as possible. As near the camera 110 as possible means that pixels of the user interface 336 nearest the camera 110 present the object 332. The criterion can include a default or user-specified angle, such as 15 degrees, 20 degrees, 30 degrees, a lesser number of degrees or a number of degrees therebetween.

In some embodiments, the user interface 336 can be presented using foveated rendering. Foveated rendering forces a portion of a screen to be in focus and a remainder of the screen to be out of focus. Using foveated rendering, the gaze of the participant 260 tends to be on the portion of the user interface 336 that is in focus.

Figure 5:
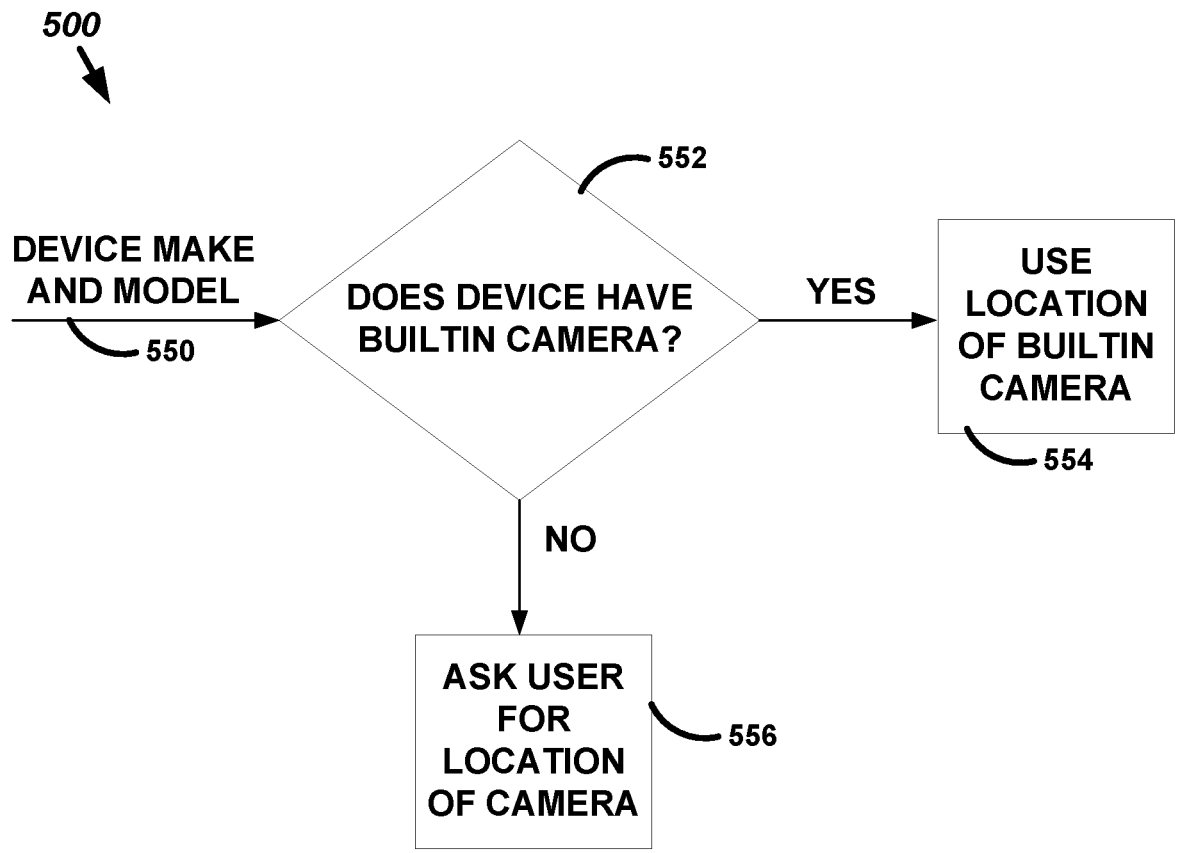
FIG. 5 illustrates, by way of example, a block diagram of an embodiment of method for determining a location of the camera.

FIG. 5 illustrates, by way of example, a block diagram of an embodiment of method 500 for determining a location of the camera 110. At operation 552, the information generator 234 or another component of the device 224 can determine whether the device 224 has a built-in camera. The operation 552 can be performed based on a make and model 550 of the device 224. The make is a manufacturer of the device 224, such as Hewlett Packard, Apple, Dell, Microsoft, Lenovo, or the like. The model indicates a specific configuration of components of the device 224. For example, iPhone X, Latitude 9520, among many others.

The information generator 234 perform the operation 552, such as by querying the external data 238 to determine whether the device 224 includes a built-in camera. If it is determined, at the operation 552, that the device 224 does have a built-in camera, the information generator 234 can use a location of the built-in camera as the location of the camera at operation 554. If it is determined, at operation 552, that the device 224 does not have a built-in camera, the information generator 234 can ask the user to specify the location of the camera 110 at operation 556.

Note that the operation 552 is just one way of inferring where the camera 110 is located. Other ways of inferring where the camera is located include asking the participant 260 to gaze at the camera 110, determining a location of the gaze, verifying the gaze includes a head pose that corresponds to facing the camera 110 based on video data from the camera 110, generating a histogram of the participant 260 gaze, a combination thereof, or the like.

Figure 6:
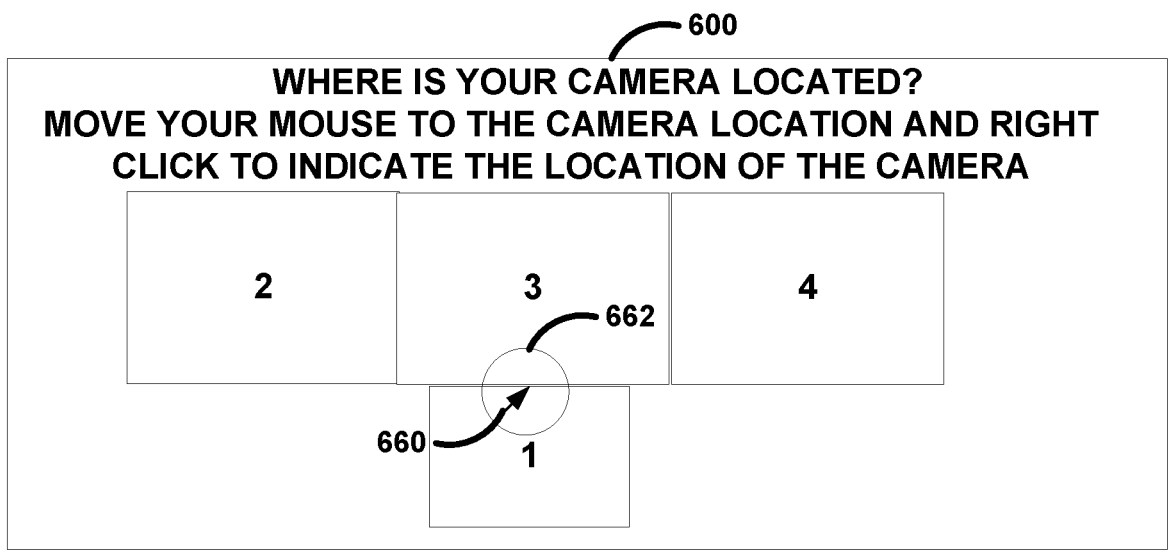
FIG. 6 illustrates, by way of example, a block diagram of an interface for performing the operation.

FIG. 6 illustrates, by way of example, a block diagram of an interface 600 for performing the operation 556. The interface 600 provides a depiction of a display configuration of the participant 260. The display configuration can be determined through the operating system settings data. In the example of FIG. 6, the participant 260 has a fairly complex display setup that includes four displays numbered "1", "2", "3", "4". The user can be prompted to select a location of the camera relative to their current display configuration. In the example of FIG. 6, the participant 260 is prompted to move their mouse pointer 660 to the location of the camera 110 relative to the displays and right click to indicate the approximate location of the camera 110. In the example of FIG. 6, the participant 260 has selected a location about centered between displays 3 and 1.

The information generator 234, in the instance of FIG. 6, can (e.g., responsive to determining a video conference is occurring) present the information 106 in a region 662 proximate the camera 110. This will cause the participant 260 to gaze proximate the camera 110 and at least provide the appearance that the participant is engaged with the video conference by increasing the appearance of eye contact with the camera.

Many participants have different items that they tend to focus on during a video conference. One participant can tend to focus on an active speaker, another participant can tend to focus on a chat, yet another participant can tend to focus on the content being presented, and yet another participant can tend to focus on emails or other items received from an external application that are received during the video conference. In some embodiments, the participant 260 can specify their preferences for content presented proximate the location of the camera 110.

Figure 7:
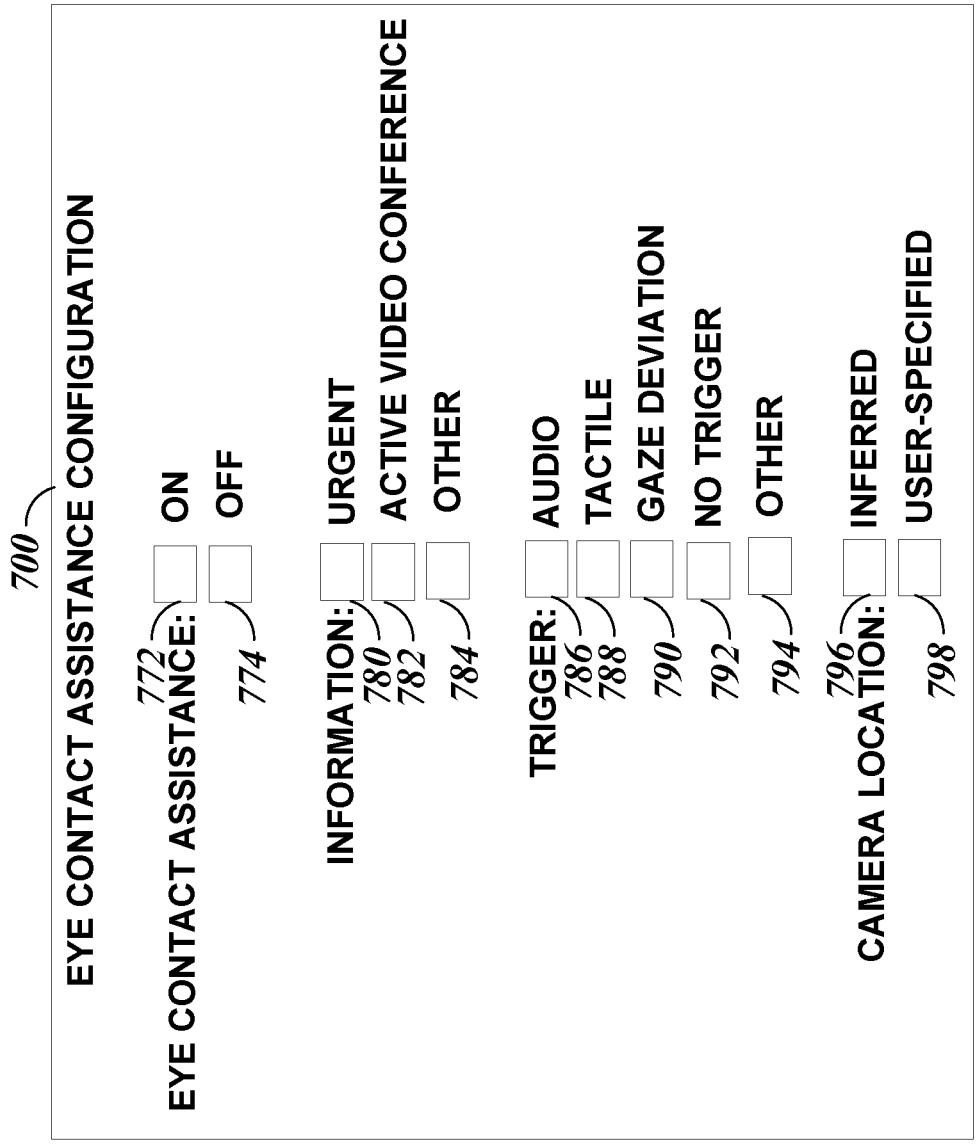
FIG. 7 illustrates, by way of example, a diagram of an embodiment of a user interface for eye contact assistance configuration.

FIG. 7 illustrates, by way of example, a diagram of an embodiment of a user interface 700 for eye contact assistance configuration. While the eye contact assistance interface 700 is illustrated and described as including radio buttons and text input boxes, the interface 700 can be implemented using one or more dropdown menus, sticky menus, scroll panels, card style selection interfaces, forms, steppers, switches, sliders, buttons, auto-fillers, a combination thereof, or the like.

Using the interface 700, the participant 260 can turn eye contact assistance on by selecting (e.g., physically selecting, such as by a mouse, touchscreen, touchpad, pen, stylus, or the like, audibly selecting, such as by a voice command, tactile selection, such as by a braille interface, or the like) a software control 772. The participant can turn eye contact assistance off by selecting a software control 774. The software controls of the interface 700 are illustrated as being radio buttons but can be different software controls that allow the user to configure the eye contact assistance performed by the information generator 234 or another component of the device 224.

The participant 260 can select or otherwise indicate what information is presented near the camera 110 by using software controls 780, 782, 784, or a combination thereof. The software control 780, when selected causes items that are marked as high importance, urgent, have a short deadline, or the like, to be presented proximate the camera 110. The software control 782, when selected causes the active speaker, content, live chat, or the like of the video conference to be presented proximate the camera 110. The participant 260 can define different content for presentation proximate the camera 110 using the software control 784. Other content can include a graphic, text, content from an application other than the video conference application that is not necessarily urgent, a combination thereof, or the like.

Using software controls 786, 788, 790, 792, 794 the participant 260 can define a trigger (or lack of trigger) that causes the information 106 indicated by the software controls 780, 782, 784 to be presented proximate the camera 110. The software control 786, when selected, allows the participant 260 to define an utterance that, when detected, causes the information generator 234 to present the information 106 proximate the camera 110. The software control 788, when selected, allows the participant 260 to define a physical input that, when detected, cause the information generator 234 to present the information 106 proximate the camera 110. The software control 790, when selected, causes the information generator 234 to present the information 106 proximate the camera 110 responsive to detecting the gaze of the participant 260 deviates away from the camera 110 (more details regarding gaze deviation are provided regarding FIGS. 3-4).

The software control 792, when selected, causes the information generator 234 to provide the information 106 proximate the camera 110 regardless of whether a trigger is detected or not. In embodiments that include the software control 792, the information generator 234 can be set to a default setting of providing a view of the video conference without consideration for the location of the camera 110. The software control 794, when selected, allows the participant 260 to define a trigger that cannot be defined using the software controls 786, 788, 790, 792. The other trigger can include detection of a gesture in the A/V stream 222, detection of an object in the A/V stream 222, a compound trigger that is a combination of triggers, or the like.

The participant 260 can specify whether the camera location 226 is to be inferred (using software control 796) or specified by the participant 260 (using software control 798). Inferring the camera location 226 can include: asking the participant 260 to gaze at the camera 110, determining a pixel or pixels on the displays closest to the gaze, and using the determined pixel or pixels as the camera location 226; using a trained machine learning model to infer a location of the camera 110; analyzing video data from the camera 110 to determine the camera location (e.g., such as by using a world ray or the like) relative to the user; generating a histogram of the user gaze and determining the camera location 226 based on the user gaze; or the like. The user can specify the camera location 226 in a number of ways including: selecting a location of the camera 110 as described regarding FIG. 6; the user providing a natural text or audio description of the camera location 226; or the like.

Figure 8:
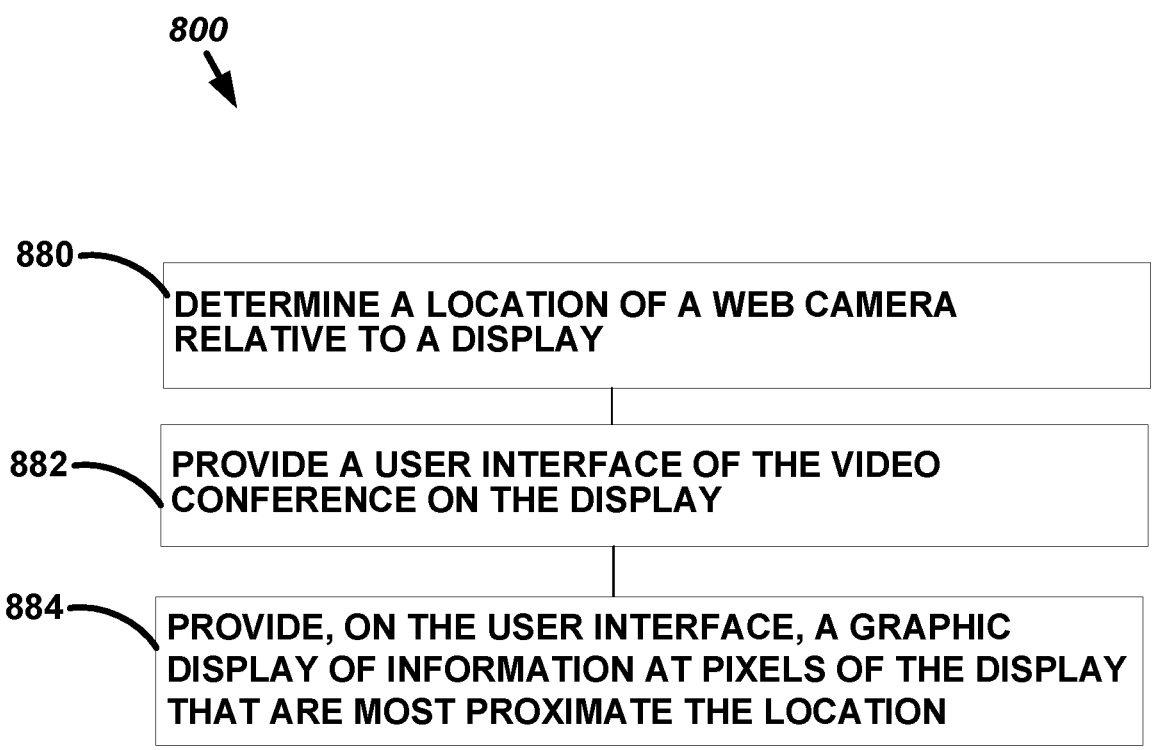
FIG. 8 illustrates, by way of example, a diagram of an embodiment of a method for eye contact assistance in a video conference.

FIG. 8 illustrates, by way of example, a diagram of an embodiment of a method 800 for eye contact assistance in a video conference. The method 800 as illustrated includes determining a location of the web camera relative to a display, at operation 880; providing a user interface of the video conference on the display, at operation 882; and providing, on the user interface, a graphic display of information at pixels of the display that are most proximate the location, at operation 884.

The method 800 can further include receiving video data from the web camera. The method 800 can further include determining a gaze direction of a user in the video data based on the video data. The method 800 can further include inferring, based on the gaze direction, the location of the web camera.

The operation 880 can include prompting, by the user interface, a user to provide the location; and receiving the location from the user. The operation 884 can include receiving trigger data. The operation 884 can include comparing the trigger data to determine a condition is met. The operation 884 can include responsive to determining the condition is met, providing the information by the pixels.

The method 800 can further include receiving, from a user and by the user interface, information data indicating content of the information. The method 800 can further include receiving, from the user and by the user interface, form data indicating how the content is presented. The method 800 can further include presenting, by the user interface, the content in a form indicated by the form data. The information can include video data of an active speaker, a chat window, or content of a shared screen. The information can include data received by a second application, the second application different from an application the provides functionality of the video conference.

The method 800 can further include determining a user is not gazing at the camera. The method 800 can further include responsive to determining the user is not gazing at the camera, providing the information at the pixels. Determining the user is not gazing at the camera can include determining the user has not gazed at the camera for a specified amount of time.

Figure 9:
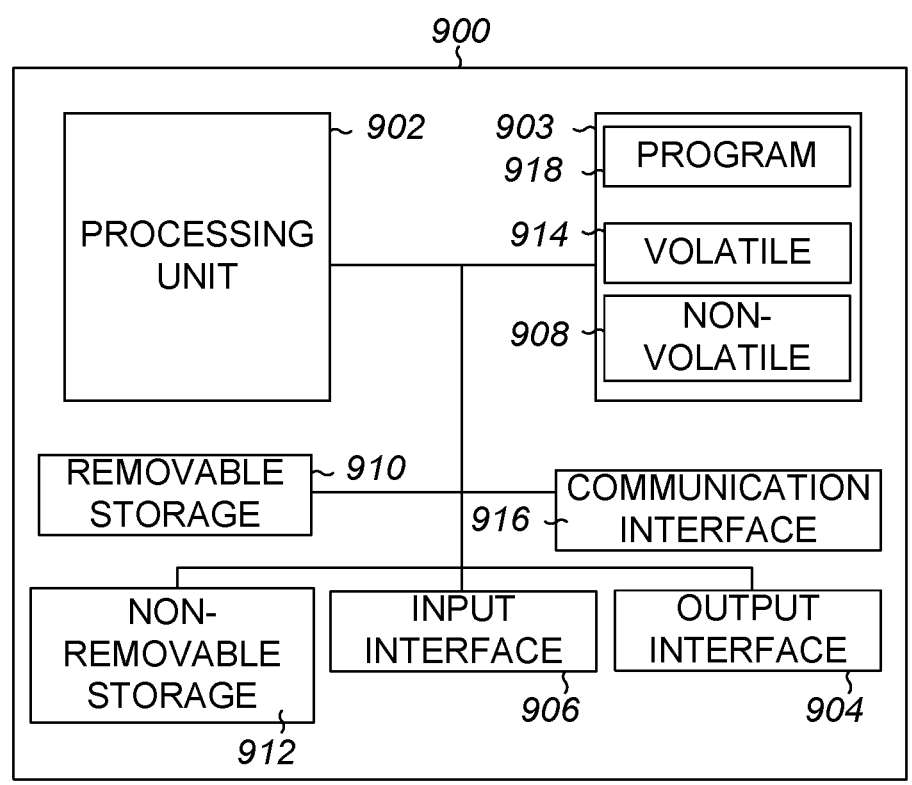
FIG. 9 illustrates, by way of example, a block diagram of an embodiment of a machine (e.g., a computer system) to implement one or more embodiments.

FIG. 9 illustrates, by way of example, a block diagram of an embodiment of a machine 900 (e.g., a computer system) to implement one or more embodiments. The system 100, camera 110, display 114, device 224, information generator 234, application 262, or the like, can include one or more of the components of the machine 900. One or more of the system 100, camera 110, display 114, device 224, information generator 234, application 262, method 500, interface 336, interface 600, interface 700, method 800 or a component or operations thereof can be implemented, at least in part, using a component of the machine 900. One example machine 900 (in the form of a computer), may include a processing unit 902, memory 903, removable storage 910, and non-removable storage 912. Although the example computing device is illustrated and described as machine 900, the computing device may be in different forms in different embodiments. For example, the computing device may instead be a smartphone, a tablet, smartwatch, or other computing device including the same or similar elements as illustrated and described regarding FIG. 9. Devices such as smartphones, tablets, and smartwatches are generally collectively referred to as mobile devices. Further, although the various data storage elements are illustrated as part of the machine 900, the storage may also or alternatively include cloud-based storage accessible via a network, such as the Internet.

Memory 903 may include volatile memory 914 and non-volatile memory 908. The machine 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 900 may include or have access to a computing environment that includes input 906, output 904, and a communication connection 916. Output 904 may include a display device, such as a touchscreen, that also may serve as an input component. The input 906 may include one or more of a touchscreen, touchpad, mouse, keyboard, camera, one or more device-specific buttons, one or more sensors integrated within or coupled via wired or wireless data connections to the machine 900, and other input components. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 902 (sometimes called processing circuitry) of the machine 900. A hard drive, CD-ROM, and RAM are some examples of articles including a non-transitory computer-readable medium such as a storage device. For example, a computer program 918 may be used to cause processing unit 902 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

ADDITIONAL NOTES AND EXAMPLES

Example 1 includes a system comprising processing circuitry, and a memory including instructions that, when executed by the processing circuitry, cause the processing circuitry to perform operations for eye contact assistance with a web camera in a video conference, the operations comprising determining a location of the web camera relative to a display, providing a user interface of the video conference on the display, and providing, on the user interface, a graphic display of information at pixels of the display that are most proximate the location.

In Example 2, Example 1 further includes, wherein the operations further comprise receiving video data from the web camera, determining a gaze direction of a user in the video data based on the video data, and inferring, based on the gaze direction, the location of the web camera.

In Example 3, at least one of Examples 1-2 further includes, wherein determining the location of the web camera includes prompting, by the user interface, a user to provide the location; and receiving the location from the user.

In Example 4, at least one of Examples 1-3 further includes, wherein providing the graphic display of information comprises receiving trigger data, comparing the trigger data to determine a condition is met, and responsive to determining the condition is met, providing the information by the pixels.

In Example 5, at least one of Examples 1~4 further includes, wherein the operations further comprise receiving, from a user and by the user interface, information data indicating content of the information.

In Example 6, Example 5 further includes, wherein the operations further comprise receiving, from the user and by the user interface, form data indicating how the content is presented, and presenting, by the user interface, the content in a form indicated by the form data.

In Example 7, at least one of Examples 5-6 further includes, wherein the information includes video data of an active speaker, a chat window, or content of a shared screen.

In Example 8, at least one of Examples 5-7 further includes, wherein the information includes data received by a second application, the second application different from an application the provides functionality of the video conference.

In Example 9, at least one of Examples 1-8 further includes, wherein the operations further comprise determining a user is not gazing at the camera, and responsive to determining the user is not gazing at the camera, providing the information at the pixels.

In Example 10, Example 9 further includes, wherein determining the user is not gazing at the camera, includes determining the user has not gazed at the camera for a specified amount of time.

Example 11 includes a method to perform the operations of the processing circuitry of at least one of Examples 1-10.

Example 12 includes a machine-readable medium including instructions that, when executed by a machine, cause the machine to perform operations of the method of Example 11.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system comprising:
   processing circuitry;
   a memory including instructions that, when executed by the processing circuitry, cause the processing circuitry to perform operations for eye contact assistance with a web camera in a video conference, the operations comprising:
   determining a first location of the web camera relative to a display;
   providing a user interface of the video conference on the display;
   identifying a second location on the display and not proximate the first location at which a user is gazing; and
   responsive to identifying the second location, providing, on the user interface, a graphic display of information, including an object at the second location, at pixels of the display that are most proximate the first location.

2. The system of claim 1, wherein the operations further comprise:
   receiving video data from the web camera;
   determining a gaze direction of a user in the video data based on the video data; and
   inferring, based on the gaze direction, the location of the web camera.

3. The system of claim 1, wherein determining the location of the web camera includes:
   prompting, by the user interface, a user to provide the location; and
   receiving the location from the user.

4. The system of claim 1, wherein providing the graphic display of information comprises:
   receiving trigger data;
   comparing the trigger data to determine a condition is met; and
   responsive to determining the condition is met, providing the information by the pixels.

5. The system of claim 1, wherein the operations further comprise:
   receiving, from a user and by the user interface, information data indicating content of the information.

6. The system of claim 5, wherein the operations further comprise:
   receiving, from the user and by the user interface, form data indicating how the content is presented; and
   presenting, by the user interface, the content in a form indicated by the form data.

7. The system of claim 5, wherein the information includes video data of an active speaker, a chat window, or content of a shared screen.

8. The system of claim 5, wherein the information includes data received at an application that provides functionality of the video conference and from a second application, the second application different from the application that provides functionality of the video conference.

9. The system of claim 1, wherein the operations further comprise:
   determining a user is not gazing at the camera; and
   responsive to determining the user is not gazing at the camera, providing the information at the pixels.

10. The system of claim 9, wherein determining the user is not gazing at the camera, includes determining the user has not gazed at the camera for a specified amount of time.

11. A method for eye contact assistance in a video conference, the method comprising:
    determining a first location of a web camera relative to a display;
    providing a user interface of the video conference on the display;
    identifying a second location on the display and not proximate the first location at which a user is gazing; and
    responsive to identifying the second location, providing, on the user interface, a graphic display of information, including an object at the second location, at pixels of the display that are most proximate the first location.

12. The method of claim 11, further comprising:
    receiving video data from the web camera;
    determining a gaze direction of a user in the video data based on the video data; and
    inferring, based on the gaze direction, the location of the web camera.

13. The method of claim 11, wherein determining the location of the web camera includes:
    prompting, by the user interface, a user to provide the location; and
    receiving the location from the user.

14. The method of claim 11, wherein providing the graphic display of information comprises:
receiving trigger data;
comparing the trigger data to determine a condition is met; and
responsive to determining the condition is met, providing the information by the pixels.

15. A machine-readable medium including instructions that, when executed by a machine, cause the machine to perform operations for eye contact assistance in a video conference, the operations comprising:
determining a first location of a web camera relative to a display;
providing a user interface of the video conference on the display;
identifying a second location on the display and not proximate the first location at which a user is gazing; and
responsive to identifying the second location, providing, on the user interface, a graphic display of information, including an object at the second location, at pixels of the display that are most proximate the first location.

16. The machine-readable medium of claim 15, wherein the operations further comprise:
receiving, from a user and by the user interface, information data indicating content of the information.

17. The machine-readable of claim 16, wherein the operations further comprise:
receiving, from the user and by the user interface, form data indicating how the content is presented; and
presenting, by the user interface, the content in a form indicated by the form data.

18. The machine-readable medium of claim 16, wherein the information includes video data of an active speaker, a chat window, or content of a shared screen.

19. The machine-readable medium of claim 16, wherein the information includes data received at an application that provides functionality of the video conference and from a second application, the second application different from the application that provides functionality of the video conference.

20. The machine-readable medium of claim 15, wherein the operations further comprise:
determining a user is not gazing at the camera; and
responsive to determining the user is not gazing at the camera, providing the information at the pixels.

* * * * *